2. Sheets. Sheet. 1.

C. Alden,

Evaporator.

No. 4,287. Reissued Mar. 7. 1871.

Witnesses.
C. Wahlert.
E. F. Kastenhuber

Charles Alden Inventor.
By Van Santvoord & Hauff
his attys

N. PETERS, PHOTO-LITHOGRAPHER, WASHINGTON, D. C.

C. Alden, 2. Sheets. Sheet 2.

Evaporator.

No. 4,287. Reissued Mar. 7. 1871.

Witnesses
C. Wanders
S. F. Kastenhuber

Charles Alden Inventor.
By Law Dauthons & Mauff his attys

N. PETERS, PHOTO-LITHOGRAPHER, WASHINGTON, D. C.

UNITED STATES PATENT OFFICE.

CHARLES ALDEN, OF NEWBURG, ASSIGNOR OF PART INTEREST TO ALDEN FRUIT-PRESERVING COMPANY, OF NEW YORK, N. Y.

IMPROVEMENT IN TREATING FRUITS TO DRY, SACCHARIFY, AND PRESERVE THEM.

Specification forming part of Letters Patent No. 100,835, dated March 15, 1870; reissue No. 4,011, dated June 7, 1870; reissue No. 4,287, dated March 7, 1871.

*To all whom it may concern:*

Be it known that CHARLES ALDEN, of Newburg, in the county of Orange and State of New York, did invent a new and useful Improvement in Evaporating the Moisture from Animal and Vegetable Substances; and this is hereby declared to be a full, clear, and exact description thereof, which will enable those skilled in the art to make and use the same, reference being had to the accompanying drawing forming part of this specification, in which drawing—

Figure 1:
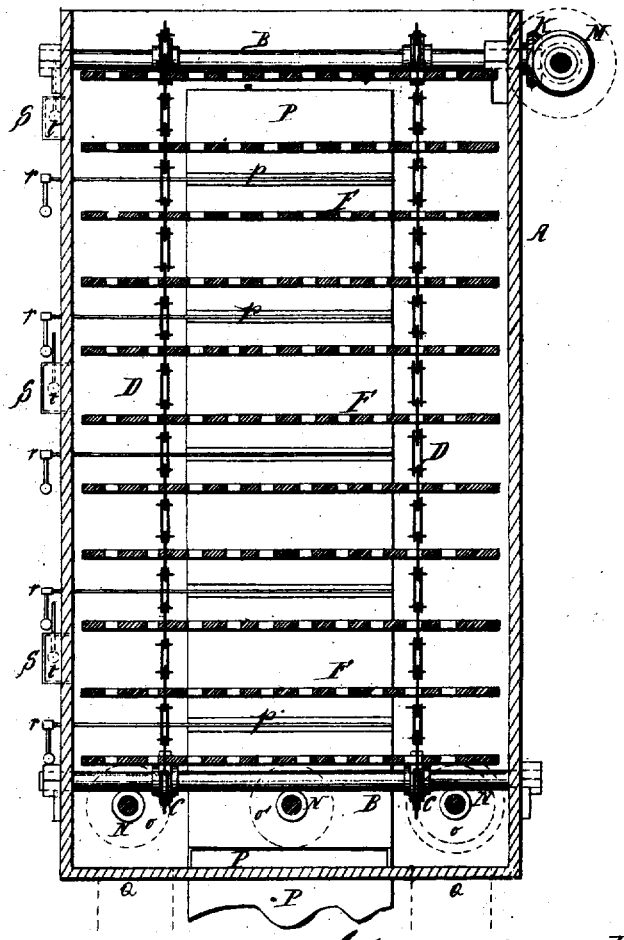
Figure 3:
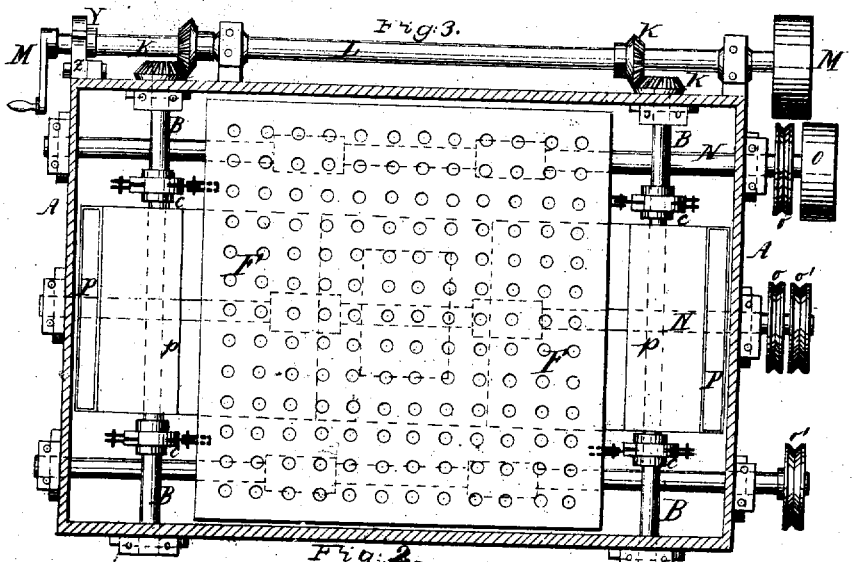
Figure 2:
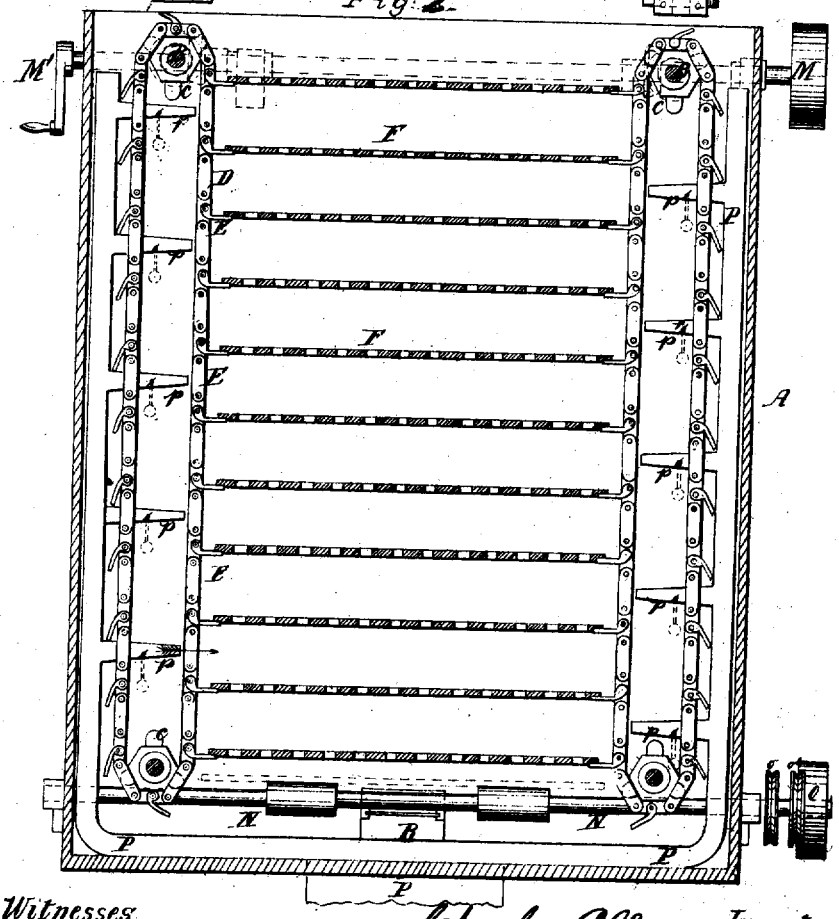

Figure 1 represents a transverse vertical section of the apparatus which may be used in carrying out this invention. Fig. 2 is a longitudinal vertical section of the same. Fig. 3 is a horizontal section of the same.

Similar letters indicate corresponding parts.

This invention consists in evaporating the moisture from vegetable and animal substances, by exposing the same, first, to a comparatively low temperature, and to currents of rarefied air of little force, and then advancing them gradually toward a higher temperature, and to currents of air of an increased force and rarefaction, in such a manner that the articles from which the moisture is to be evaporated are gradually expanded and the moisture is rapidly and completely expelled without changing the nature of the articles under treatment. When applied to fruits or vegetables, this process may be termed a supermaturing process, since by its action the natural maturing process is continued, and the product obtained by this process is superior in sweetness to fruits or vegetables dried in the ordinary manner.

In carrying out this invention, the substances from which the moisture is to be evaporated are spread upon platforms F, which are placed one above the other in the interior of a trunk or chamber, A, and which may be made to rest on supports E, secured to endless chains D D, which run over chain-wheels C C, mounted on shafts B B, having their bearings on the side of the trunk or chamber. Said platforms are perforated with small holes, to allow a free circulation of the air; and if the chain-wheels are caused to revolve, a rising or falling motion is imparted to the platforms. The motion of the chain-wheels is derived from the driving-shaft L, which is driven either by a hand-crank, M′, or by a pulley, M, said shaft being connected with the chain-shafts B B by means of gear-wheels K and a stop-pawl, Z, which, engaging with a ratchet-wheel, Y, mounted on the driving-shaft L, serves to arrest the chains at any desired point. The chain-wheels C C, at the bottom of the trunk, are driven simply by the chains; and if the trunk is high, the chains are steadied by intermediate guide-rollers. Each of the platforms, on reaching the bottom of the trunk, is deposited upon the conveyer N, which receives motion by a pulley, O, and small belt-wheels *o o′*, and by this conveyer the successive platforms are carried out of the trunk, so that they can be readily removed and again introduced at the top of the trunk. On the sides of the trunk are arranged two air-chambers, P P, which are supplied with hot or cold air from below, and which are provided with nozzles *p* for the discharge of the air. By these means currents of hot or cold air are thrown over or between the platforms, and these currents are regulated by dampers *r*. If hot air is used, suitable thermometers *t* may be applied in boxes S, attached to the sides of the trunk, to indicate the temperature of the air therein. Suitable flues Q Q may be applied, to introduce currents of cold air into the trunk to regulate the temperature, if desired.

The articles or materials from which the moisture is to be evaporated are placed upon the platforms, which are arranged in the trunk or chamber, one above the other, where said articles are exposed to the currents of air injected through the nozzles *p;* and as said currents pass over, through, and around the articles or substances spread upon the platforms, the moisture contained in said articles is rapidly carried off. This effect is materially facilitated by injecting into the trunk currents of heated rarefied air, and by imparting to the platforms a slow downward motion in the trunk, as above stated. By the action of the heated rarefied air, the substances from which the moisture is to be evaporated are expanded, and the moisture is rapidly expelled; and if the platforms, on which said substances are spread, have a slow downward motion, the effect of the rarefied air is still further increased, since the substances, on being introduced at the top of the trunk, reduce the temperature of the currents of air, and at the same time said currents have less force than they have at the bottom of the trunk; and as the platforms descend, the substances spread thereon are gradually advanced toward a higher temperature, and to currents of air of increased force and rarefaction, and the process of evaporating the moisture, particularly from fruits or vegetables, can be effected with a success not obtained by any other known process. At the same time, by this process—which, on account of its effect, may well be called a supermaturing process—the chemical nature of the product is changed, as will be seen from the subjoined analysis of apples, where column No. 1 relates to fresh apple; column No. 2, to apple dried in the ordinary manner; column No. 3, to apple dried by the Alden process.

| Analysis of apple. | No. 1. | No. 2. | No. 3. |
|---|---|---|---|
| Water | 82.23 | 12.42 | 16.62 |
| Cellulose insoluble in water, (fibrous skeleton) | 1.92 | 10.54 | 10.22 |
| Protein, (analogous to albumen) | .15 | .80 | .76 |
| Amylaceous cellulose, (analogous to starch) | 6.59 | 30.95 | 29.75 |
| Pectine, (analogous to gelatine) | 2.47 | 11.35 | 10.80 |
| Bassorin, (gummy) | 1.35 | 7.22 | 4.33 |
| Acids: tartaric, citric, formic, malic, traces of oxalic | 1.34 | 4.88 | 3.43 |
| Grape-sugar | 3.75 | 18.75 | 23.08 |
| Chlorophyl and extracts | .03 | .12 | .15 |
| Mineral matter | .17 | .87 | .78 |
| Essential ethyls, imponderable traces | .00 | .00 | .00 |
| Dextrine | .00 | 2.10 | .00 |
| | 100.00 | 100.00 | 100.00 |

What is claimed as new, and desired to be secured by Letters Patent, is—

1. The process of evaporating the moisture from vegetable and animal substances by exposing the same first to a comparatively low temperature, and to currents of rarefied air of little force, and then advancing them gradually toward a higher temperature, and to currents of air of an increased force and rarefication, as specified.

2. Saccharified fruit obtained by exposing fruits to a saccharifying or supermaturing process, substantially such as herein described.

CHARLES ALDEN.

A. D. DICKINSON, *President.*

Witnesses:

W. HAUFF,

E. F. KASTENHUBER.